United States Patent [19]

Storaasli

[11] Patent Number: 5,597,141

[45] Date of Patent: Jan. 28, 1997

[54] EFFICIENT MASS TRANSLATION DEVICE

[75] Inventor: Allen G. Storaasli, Hermosa Beach, Calif.

[73] Assignee: Hughes Aircraft Company, Los Angeles, Calif.

[21] Appl. No.: 280,635

[22] Filed: Jul. 25, 1994

[51] Int. Cl.$^6$ ................................................. B64G 1/24
[52] U.S. Cl. ........................... 244/164; 244/93; 244/170
[58] Field of Search ................................. 244/164, 165, 244/166, 93, 170, 169

[56] References Cited

U.S. PATENT DOCUMENTS

| | | | |
|---|---|---|---|
| 1,853,233 | 4/1932 | Schwarz | 249/93 |
| 3,516,623 | 6/1970 | Sinden | 244/169 |
| 4,470,568 | 9/1984 | Nuefeld | 244/164 |

*Primary Examiner*—Galen L. Barefoot
*Attorney, Agent, or Firm*—Terje Gudmestad; W. K. Denson-Low

[57] ABSTRACT

A dynamic balance mechanism for balance control of a gyro stabilized (spinning) satellite is disclosed. An elongated gear rack is attached to the spacecraft. A movable mass is mounted by guide rollers on the gear rack and translates along the gear rack according to requisite electronic commands. The movable mass includes a housing, a stepper motor, a rotary potentiometer, a cable reel, a pair of gear heads and a pinion gear. The pinion gear meshes with the rack and is driven by the stepper motor. The potentiometer measures the position of the movable mass on the gear rack. The cable reel saves space and minimizes harness jamming conditions. The invention secures better weight efficiency.

20 Claims, 3 Drawing Sheets

EFFICIENT MASS TRANSLATION DEVICE

This invention was made with Government support under a contract awarded by the Government. The Government has certain rights in this invention.

TECHNICAL FIELD

This invention relates to spacecraft balance mechanisms and more particularly to a system for controlling the balance of a spinning satellite.

BACKGROUND ART

Synchronous satellites orbit the Earth with the same revolution rate as that of the Earth and appear above a fixed point. Synchronous satellites are useful for many applications including weather and communication applications.

These known satellites are generally gyro stabilized in orbit by spinning at a constant speed, for example, 50 rpm. The communications antenna and electronics are despun with respect to the Earth in order to maintain a fixed point of reference with a communication or ground station. In synchronous orbit, the satellite's velocity maintains it in a fixed position relative to the Earth, thereby insuring continuity in communication services.

It is generally well known in the art that various forces act on synchronous and other satellites in a manner which might move the satellite out of its stationary orbit. These forces are due to several sources including the gravitational effects of the sun and moon, the elliptical shape of the Earth, and solar radiation pressure. Other forces, such as the depletion of propellants in the fuel supply, and movements of the internal components, act in a manner to affect the balance of the spinning satellite. Such unbalance causes wobble of the spacecraft spin axis, affecting the pointing of the communication antennas. Thus, balance control mechanisms are typically provided in spinning satellites so the balance can be regulated and controlled by instructions from the Earth. Known balance mechanisms are typically provided in groups of three or four movable weights or masses, one group adapted to be translated (moved) relative to the longitudinal axis of the satellite rotor (affecting dynamic rotor balance), and another group adapted to be moved in a transverse direction on the despun structure (affecting center of gravity static balance).

Known systems typically utilize a stationary motor which rotates a jackscrew on which a movable mass is positioned. The motor is a stepper motor which has a gear assembly and a rotary potentiometer which has a reduction gear. The motor rotates the jackscrew and thereby moves the balancing mass in minute increments electrically controlled by the Earth ground station. The size of the mass and length of travel are restricted, however, with this known device. Usually, it is required that the movable mass be positioned at the center of travel during launch of the satellite, which results in the mass being placed in a cantilever condition on the jackscrew. This restricts the design in terms of travel length because the mass on the jackscrew is subjected to tremendous vibrations caused by the launch.

A second known balance mechanism also utilizes a motor, mass and jackscrew, together with a potentiometer and associated gearing mechanisms. In this design, however, the jackscrew does not rotate and the motor and mass both translate along the length of the jackscrew by means of a nut mechanism which is rotated by the motor. Although this second known balance mechanism is more efficient than the first type described above, it is also restricted in terms of size and travel length because the mass again must be at the center of travel during launch and thus must again survive the launch vibration in a cantilever configuration. In either design, it might be possible to protect against failure during launch by providing larger and sturdier jackscrews, but this would add additional weight to the satellite which is undesirable.

As a result, both of these known balance mechanisms are relatively inefficient in terms of movable mass and adjustment length compared to their total weight.

SUMMARY OF THE INVENTION

It is an object of the present invention to provide a balance mechanism, particularly a dynamic balance mechanism, which is an improvement over known balance mechanisms. It is another object of the present invention to provide an on-orbit balance control mechanism for a gyro stabilized satellite which minimizes dead weight and has a longer adjustment length.

It is a further object of the present invention to provide a balance mechanism in which the movable mass includes the motor and gear head which leaves the gear rack as the only dead weight. It is a still further object of the present invention to provide a unique harness spooling arrangement which saves space and prevents winding and unwinding difficulties as the mass moves.

In accordance with the present invention, a balance mechanism is provided which positions a movable weight along a geared rack in order to adjust its mass properties and thus control the balance of the gyro-stabilized satellite. One or more (preferably a set of three) elongated lightweight gear racks are positioned in predetermined positions on the satellite. A movable mass is secured to each of the gear racks and adapted to translate along the gear racks from one end to the other. The movable mass includes a stepper motor, a gear head, a pinion gear, a rotary potentiometer, and a cable reel all enclosed within a housing.

The mass travels along a geared linear rack of appropriate length which is fastened to the spacecraft structure at frequent spacings along the length. The mass translates when the pinion gear rotates. A cable reel is attached to the motor and used to take up and unwind the cable and wiring for the motor and potentiometer.

The diameter of the take-up reel is preferably the same as the diameter of the pinion gear and the cable and wires are attached at one end to the satellite control mechanism by a spring-tensioning device. As the motor and mass translate along the gear rack, the cable is either wound or unwound from the reel accordingly.

A speed reduction gearing is preferably provided to keep the rotation of the potentiometer shaft limited to under one revolution for accuracy. Guide rollers keep the motor and mass securely on the gear rack.

The present invention provides better weight efficiency than known balance mechanisms. The effects of vibration on the movable mass during launch are minimized and thus longer travel and adjustment lengths are provided.

DESCRIPTION OF THE PREFERRED EMBODIMENT

Balance mechanisms are used in conventional satellites. They are used to control the balance of gyro-stabilized (spinning) satellites in order to remove on-orbit mass imbalances. The mechanisms are electrically controlled through commands from an Earth ground station and/or onboard computers, as explained in greater detail below.

Figure 1:
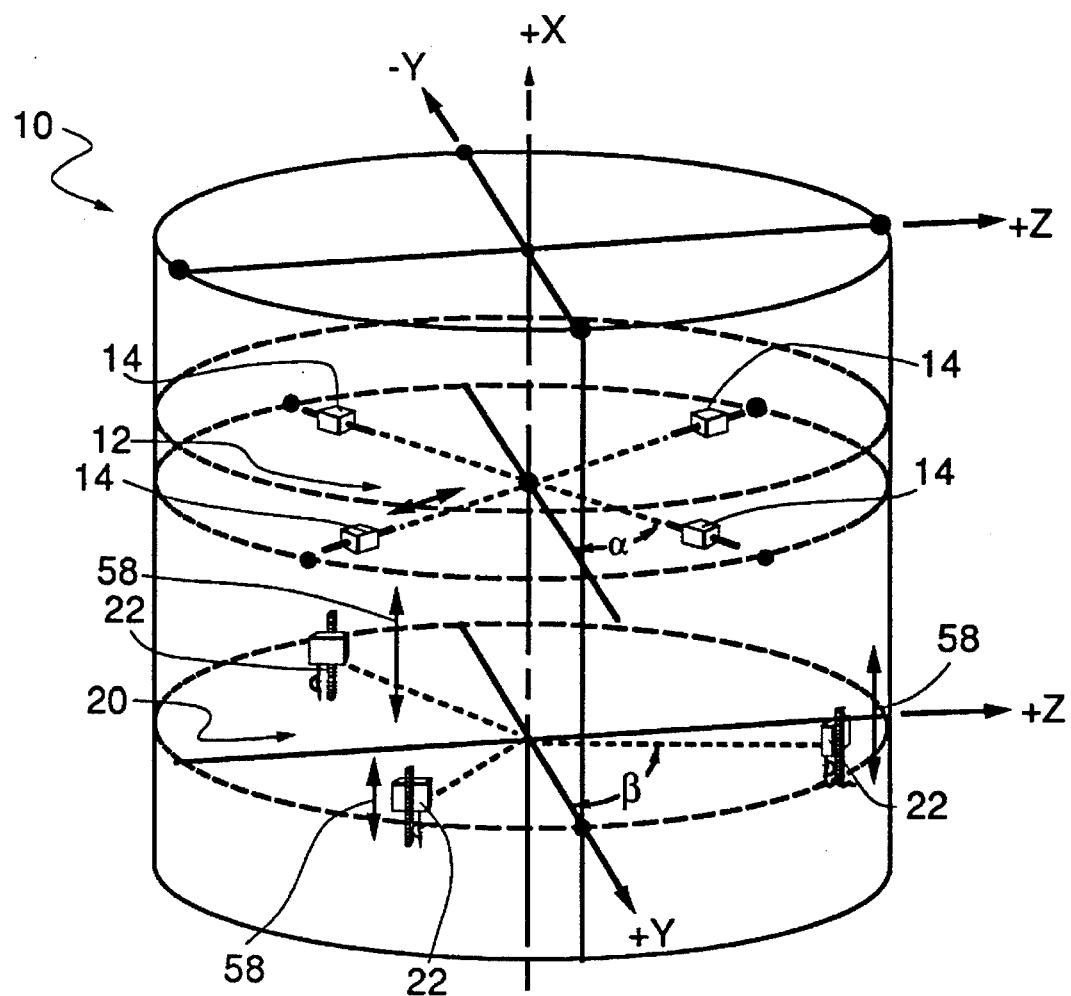
FIG. 1 schematically shows balance mechanisms for a spinning satellite.

A cylindrically shaped satellite 10 is shown schematically in FIG. 1. The three-axes of orientation of the satellite 10, namely the X, Y and Z axes, are indicated on the drawing. A first system 12 of balance mechanisms 14 is provided. The mechanisms 14 have movable masses which translate in the Y-Z plane of the satellite. For this balance system, typically four movable mass mechanisms 14 are provided. The mechanisms 14 are equidistantly located 90° apart in the Y-Z plane as indicated, and typically positioned at an angle $\alpha$ from the Y axis of the satellite.

A second balance system 20 is also provided on the spinning satellite 10. In this system, the mechanisms 22 have movable masses which move in a direction of the longitudinal axis of the satellite 10, i.e. along the X-axis as shown in FIG. 1. Typically three balance mechanisms 22 are provided in this system 20, the mechanisms positioned equidistantly from the satellite center line in a symmetrical 120° array, as shown. Also, each of the balance mechanisms is typically positioned at an angle $\beta$ from the Y-axis of the satellite.

Three balance mechanisms 22 are typically provided in the system 20. The three mechanisms provide a three-for-two redundancy since only two are required to resolve any given mass offset.

The present invention can be used with either of the systems 12 or 20 shown in FIG. 1. For illustration purposes, the present invention is shown as used with a vertically oriented system, that is a balance system which includes masses which are positioned to move along the longitudinal axis (or X-axis) of a spinning satellite. This type of system is the one most commonly used today.

The balance mechanism 25 in accordance with the present invention includes a gear rack 30, a pinion gear 32, a stepper motor 34, a cable reel 36, a first gear head assembly 38, a second gear head assembly 40 and a rotary potentiometer 41. The motor gear heads, pinion gear, potentiometer and cable reel are enclosed within a housing 42.

The mechanism 25 includes a rack and pinion drive mechanism. The gear rack 30 is an elongated member made out of aluminum or a titanium alloy. The gear rack 30 is securely attached, such as by screws, bolts or other conventional fasteners 44 to the satellite 10. The gear rack 30 can be secured inside the outer surface of the satellite 10 or to any of the internal structure or components. Preferably the gear rack is tightly secured to the satellite along its entire length by a plurality of fasteners 44.

Figure 2:
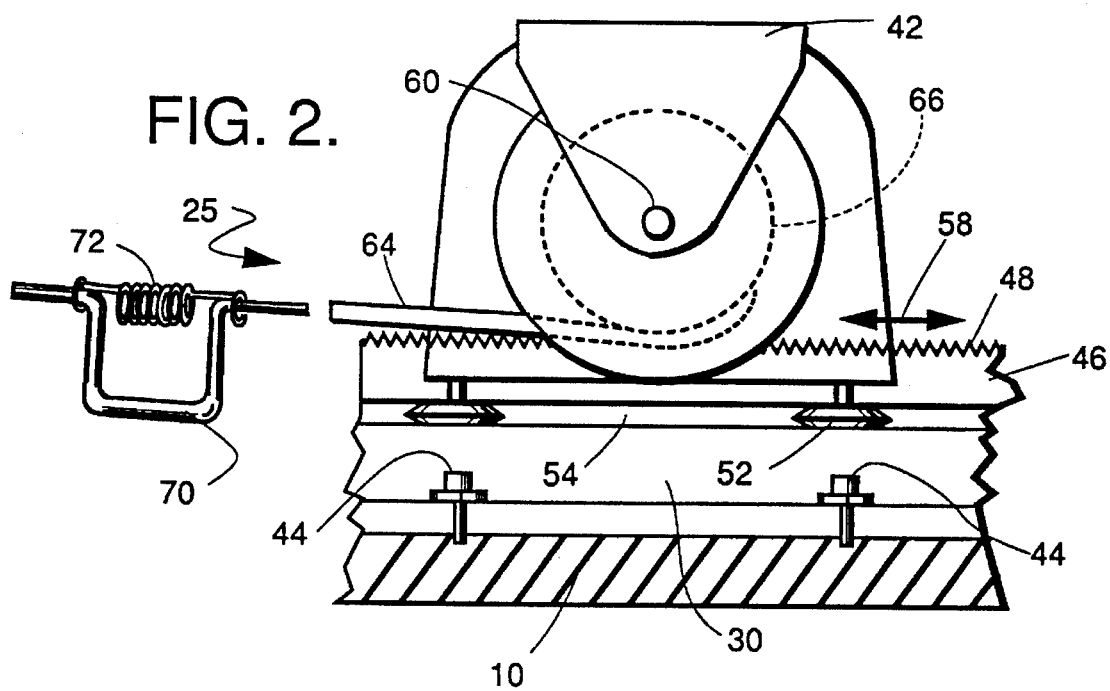
FIG. 2 illustrates a side elevational view of the present invention.
Figure 3:
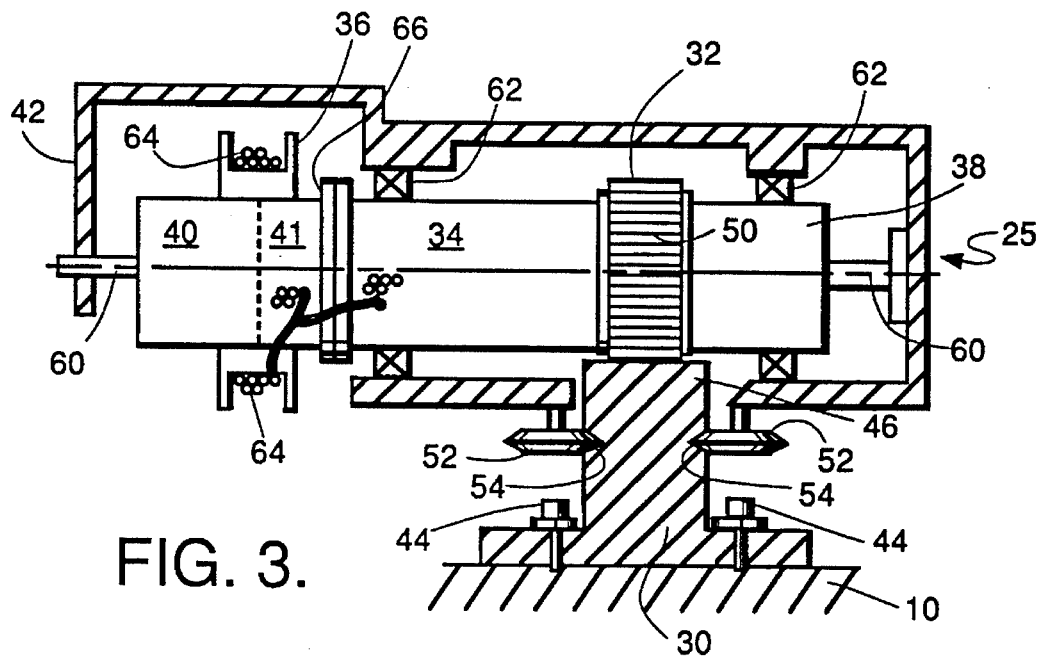
FIG. 3 depicts an end elevational view of the present invention with part of the housing broken away.

The upper surface 46 of the gear rack 30 includes a series of grooves or teeth 48 which mate with corresponding teeth 50 on the pinion gear 32, in a conventional manner. In order to secure the housing 42 and other components to the gear rack 30, two or more pairs of guide rollers 52 are positioned on the housing 42 and mate with grooves 54 in the sides of the gear rack 30. In this manner, the pinion gear 32 is constrained laterally on the gear rack 30 by the guide rollers 52 as the mechanism 25 travels along the gear rack. The guide rollers 52 also support the moving mechanism (consisting of the motor, pinion gear, cable reel, gear heads etc.) as it travels along the gear rack. The guide rollers and grooves also are provided to insure efficient contact between the pinion gear and teeth on the gear rack. In this regard, the movement of the housing 42 along the gear rack 30 is depicted by arrows 58 in FIGS. 1 and 2.

The motor, pinion gear, cable reel, gear head and other components are rotatably positioned on shaft 60 in housing 42. A pair of bearings 62, preferably ball bearings, are also provided to allow rotation of these components in the housing 42. All of the components, including the housing, stepper motor, potentiometer and the like move or translate along the gear rack when the gear pinion 32 rotates. Thus, rather than having an output shaft driving a pinion gear, the pinion gear is mounted on a motor gear head structure which is rotating because the output shaft 60 is despun by the housing 42.

A flexible wire or cable 64 supplies electrical power to the stepper motor and potentiometer in order to drive the pinion gear. The cable 64 is preferably an 8-wire flexible cable and plugs into a terminal strip or the like on the satellite adjacent one end of the gear rack 30. In the 8-wire cable 64, three of the wires 83 are utilized for the rotary potentiometer 41 and five of the wires 82 are used for the stepper motor 34.

Although the wire cable can be of any cross sectional size and shape, preferably a flat cable is provided so that it will wrap around the cable reel 36 in a more efficient manner and minimize snagging or jamming. The diameter of the surface 66 on the cable reel 36 on which the cable wire 64 is wound is preferably the same as the diameter of the pinion gear 32. This allows the length of the cable 64 to be relatively stationary with respect to the gear rack 30 and provides for ease of management of the cable during translation of the mass. Since the cable at the motor end of the mechanism is rotating at the same rate as the motor and potentiometer, windup or slip rings are not required. As the cable reel winds up the cable 64, there will be a slight change in diameter of the cable reel versus the pinion gear. For this purpose, a service loop 70 and tension spring 72 are positioned on the fixed end of the cable in order to maintain an even tension on the cable during use.

The stepper motor preferably has a step size of 90° and, coupled with gear head 38, results in an axial movement of 0.00073 inches per step. The housing 42 is preferably a rigid, box type structure made of aluminum or a titanium alloy. The guide rollers 52 are mounted on a duplexed pair of precision ball bearings. Preferably, the gears in the gear heads are made of stainless steel, while titanium alloy is preferably used for the pinion gear. All bearings and gears in the mechanism preferably are dry lubricated for ease of operation and maintenance.

The stepper motor gear head 38 has a high gear ratio M to prevent backdriving during launch vibration, as well as providing the small movement granularity. Thus, it should not be necessary to utilize launch locks for this mechanism. Also, the power-off detent torque of the motor retains the mass in place when the mechanism is not being operated.

An absolute potentiometer reading of the position of the motor and mass is preferred. Since despinning a single turn potentiometer might result in ambiguities because of the length of the gear rack 30, a speed reduction gear of ratio N is utilized to keep the potentiometer shaft limited to under one revolution. If the potentiometer 41 rotates less than 360° for the full travel of the mass on the gear rack 30, it will serve as a precise telemetry indication of the mass position. Alternatively, a "10-turn" potentiometer could be utilized without any gearing.

Figure 4:
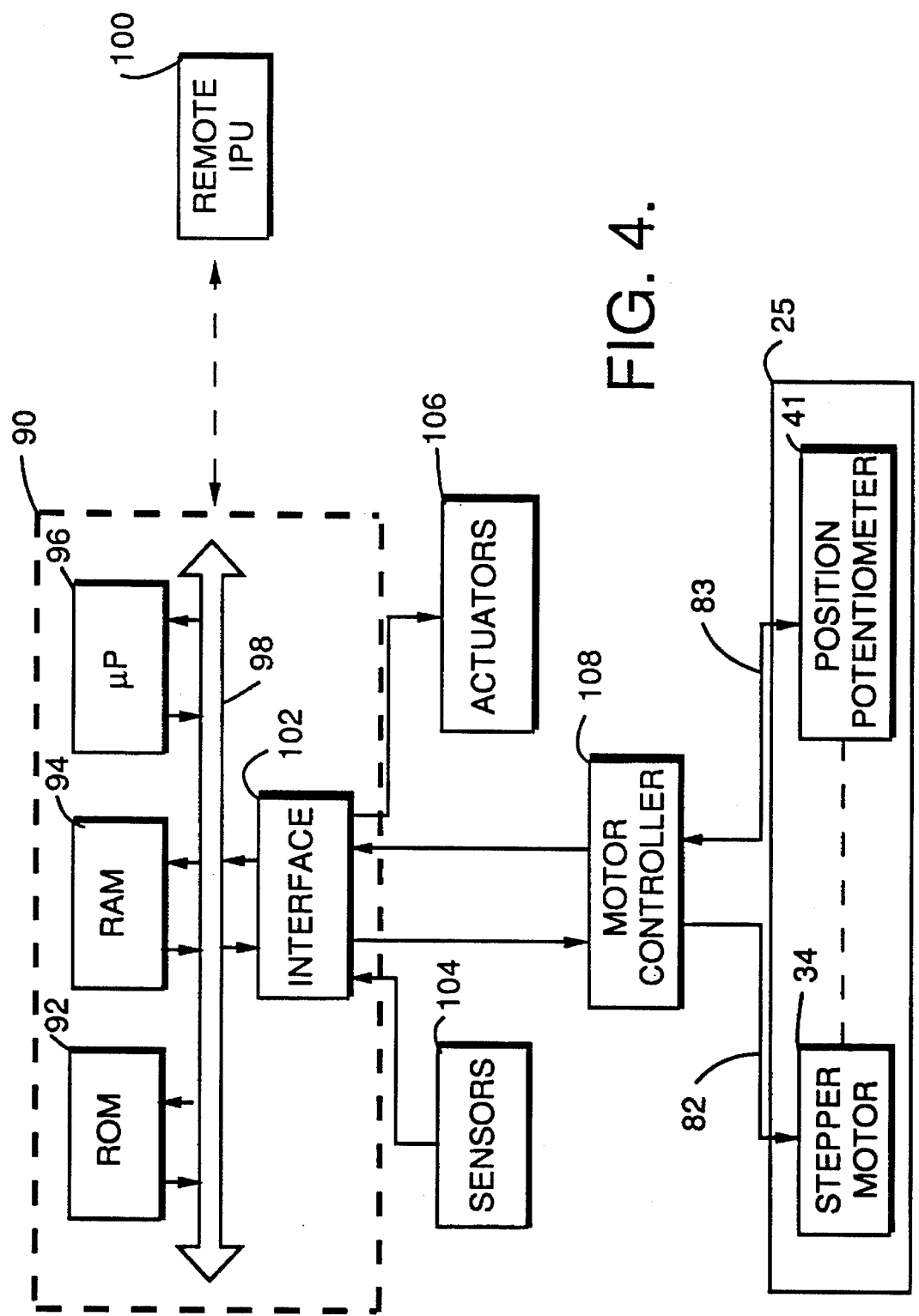
FIG. 4 is a functional block diagram of the motor control system of the present invention.

A better appreciation of the system operation may be gained by referring to the functional block diagram of FIG. 4. An information processing unit (IPU) 90 is mounted within satellite 10. As is well known in the art, IPU 90 typically includes a non-volatile memory, such as read-only memory (ROM) 92, for storing a predetermined instruction set and various system operating parameters. IPU 90 also includes a volatile memory, such as random-access memory (RAM) 94, for temporary storage of operating variables, and the like. The memories communicate with a microprocessor 96 via a data bus 98. Microprocessor 96 executes the predetermined instruction set to effect control of the satellite. IPU 90 receives operating commands from, and sends data to, a remote IPU 100, which is typically located at an Earth ground station.

IPU 90 also includes an interface 102 having appropriate circuitry to provide an interface between microprocessor 96 and sensors 104, actuators 106, and motor controller 108. Interface 102 may include amplifiers, over-voltage protection circuitry, analog-to-digital converters, digital-to-analog converters, and the like. Sensors 104, such as accelerometers, provide data relative to the current operating conditions of satellite 10, such as the attitude of the satellite. Sensors 104 provide an indication of the dynamic balance by detecting spacecraft wobble magnitude and phase. Actuators 106 include various satellite components under direct control of IPU 90, such as communication antennas and solar wings. The sensors 104 send signals to the ground station which evaluates them and commands mass movement of one or more of the balance mechanisms.

Motor controller 108 receives commands from IPU 90 (which may originate from remote IPU 100) and generates the necessary signals to control stepper motor 34. Position potentiometer 41 is indirectly coupled to stepper motor 34 (via gear rack 30 and the speed reduction gear) and provides a position feedback signal to motor controller 108 via three wires 83, as previously described. Wires 83 are connected to potentiometer 41 in a conventional manner with one wire connecting each terminal end and one wire connecting the wiper. To accommodate a step size of 90°, stepper motor 34 includes five wires 82 which connect four coils having a common return line. When a command is received from IPU 90, motor controller 108 generates the proper number of pulses and delivers the pulses to each of the four coils of stepper motor 34 in an appropriate sequence to effect forward or reverse rotation. As stepper motor 34 rotates, the resistance of potentiometer 41 varies, indicating a change in position along gear rack 30, closing the feedback loop.

The present invention provides a balance mechanism, particularly a dynamic balance mechanism, which has a better weight efficiency than known mechanisms and does not have the cantilever effect of jackscrew designs which are subject to launch vibration. Since the moving mass portion of the mechanism includes the motor and gear assemblies, the lightweight gear rack is left as the only dead weight. Also, since a longer adjustment length is provided, a lighter mass can be utilized thus providing a lighter total weight of the dynamic balance mechanism for the spacecraft. For example, with existing dynamic balance mechanisms, the moving mass is approximately 3.5 pounds and the dead weight is approximately 5 pounds, for a total unit weight of 8.5 pounds. Since three mechanism are provided per spacecraft, this results in a total weight of 25.5 pounds per spacecraft. The existing mechanisms also have a travel range of only approximately 12.5 inches.

With the design of the present invention, the moving mass is approximately 1.75 pounds and the dead weight is approximately 1.5 pounds, resulting in a total unit weight of 3.25 pounds. With three mechanisms per spacecraft, this results in a total weight of 9.75 pounds per spacecraft, or a savings of over 15 pounds. The length of the gear rack, that is the range of movement of the movable mass of the mechanism, is approximately 25 inches with the present invention. Since weight efficiency is determined by the weight of the mass multiplied by the adjustment length, the present invention can achieve the same dynamic balance characteristics as known balance mechanisms with a much lighter weight.

Preferably stops (not shown) are provided on each end of the gear rack 30 in order to limit the travel of the housing 42 and mass and thus prevent overdriving of the mechanism. It is also possible to provide redundant stepper motors for each drive mechanism. In normal operation, only one set of motors is used, with the second motor being provided in case of failure of the primary motor.

Readings of the potentiometer permit monitoring of the motion and position of the movable mass. The mass can be moved in both directions on the gear rack 30, as required and commanded electronically from a ground station on Earth, from onboard computers, or both.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A balance mechanism for a satellite comprising;

an elongated gear rack mounted to and supported along its length by said satellite;

a mass positionable along said gear rack;

said mass including a motor and a pinion gear connected to said motor and in meshing engagement with said elongated rack for positioning said mass.

2. The balance mechanism of claim 1 further comprising a housing enclosing said mass.

3. The balance mechanism of claim 2 wherein said housing is movably supported on said gear rack.

4. The balance mechanism of claim 3 further comprising guide rollers on said housing and grooves on said gear rack adapted to receive said guide rollers.

5. The balance mechanism of claim 2 wherein said mass is rotatably supported in said housing so that said housing does not rotate as it translates along said gear rack while said mass rotates.

6. The balance mechanism of claim 1 further comprising:

a potentiometer coupled to said motor for providing a signal indicative of position of said mass relative to said gear rack;

a first gear mechanism for said motor; and a second gear mechanism for said potentiometer.

7. The balance mechanism of claim 6 further comprising:

a reduction gear connected to said potentiometer for limiting said potentiometer to less than one revolution per travel along said gear rack.

8. The balance mechanism of claim 1 wherein said mass further includes cable reel.

9. The balance mechanism of claim 8 wherein said cable reel has a diameter substantially the same as the diameter of said pinion gear.

10. The balance mechanism of claim 1 further comprising a cable electrically connecting said motor to a power source within said satellite.

11. The balance mechanism of claim 10 wherein said mass further comprises a cable reel.

12. The balance mechanism of claim 11 further comprising tension limiting means on said cable.

13. A dynamic balance device for a gyro stabilized satellite comprising:

- a first gear member fixedly positioned on and supported along its length by said satellite;
- a second gear member movably mounted on said first gear member; and
- a motor attached to said second gear member and movable therewith.

14. The dynamic balance device of claim 13 wherein said first gear member comprises an elongated gear rack and said second gear member comprises a pinion gear.

15. The dynamic balance device of claim 13 further comprising a housing rotatably attached to said second gear member.

16. The dynamic balance device of claim 13 further comprising:

- a potentiometer coupled to said motor for indicating rotational position of said motor;
- a first gear mechanism for said motor; and
- a second gear mechanism for said potentiometer.

17. The dynamic balance device of claim 14 further comprising:

a cable reel having substantially the same diameter as said pinion gear.

18. The dynamic balance device of claim 13 wherein three of said dynamic balance devices are provided on said satellite for controlling the balance thereof.

19. A dynamic balance mechanism for a gyro stabilized satellite comprising:

- an elongated gear member attached to and supported along its length by said satellite;
- a pinion gear movably mounted on said elongated gear member;
- a stepper motor attached to said pinion gear and rotatable therewith;
- a potentiometer attached to said pinion gear and rotatable therewith;
- a cable reel attached to said pinion gear and rotatable therewith;
- a housing enclosing said pinion gear, stepper motor, potentiometer and cable reel;
- cable means connected at one end to a power source disposed within said satellite and connected at the other end to said motor and potentiometer, said cable means being wound at least partially around said cable reel;
- guide means for supporting said housing on said elongated gear member; and
- biasing means for limiting tension on said cable means.

20. The dynamic balance mechanism of claim 19 wherein three of said mechanisms are provided on said satellite in order to dynamically balance on-orbit space vehicle mass imbalances.

\* \* \* \* \*